July 15, 1924.
G. W. SWIFT, JR
1,501,500
MECHANISM FOR MAKING IMPRESSIONS UPON TRAVELING SHEETS OR WEBS
Filed Feb. 12, 1923    6 Sheets-Sheet 2
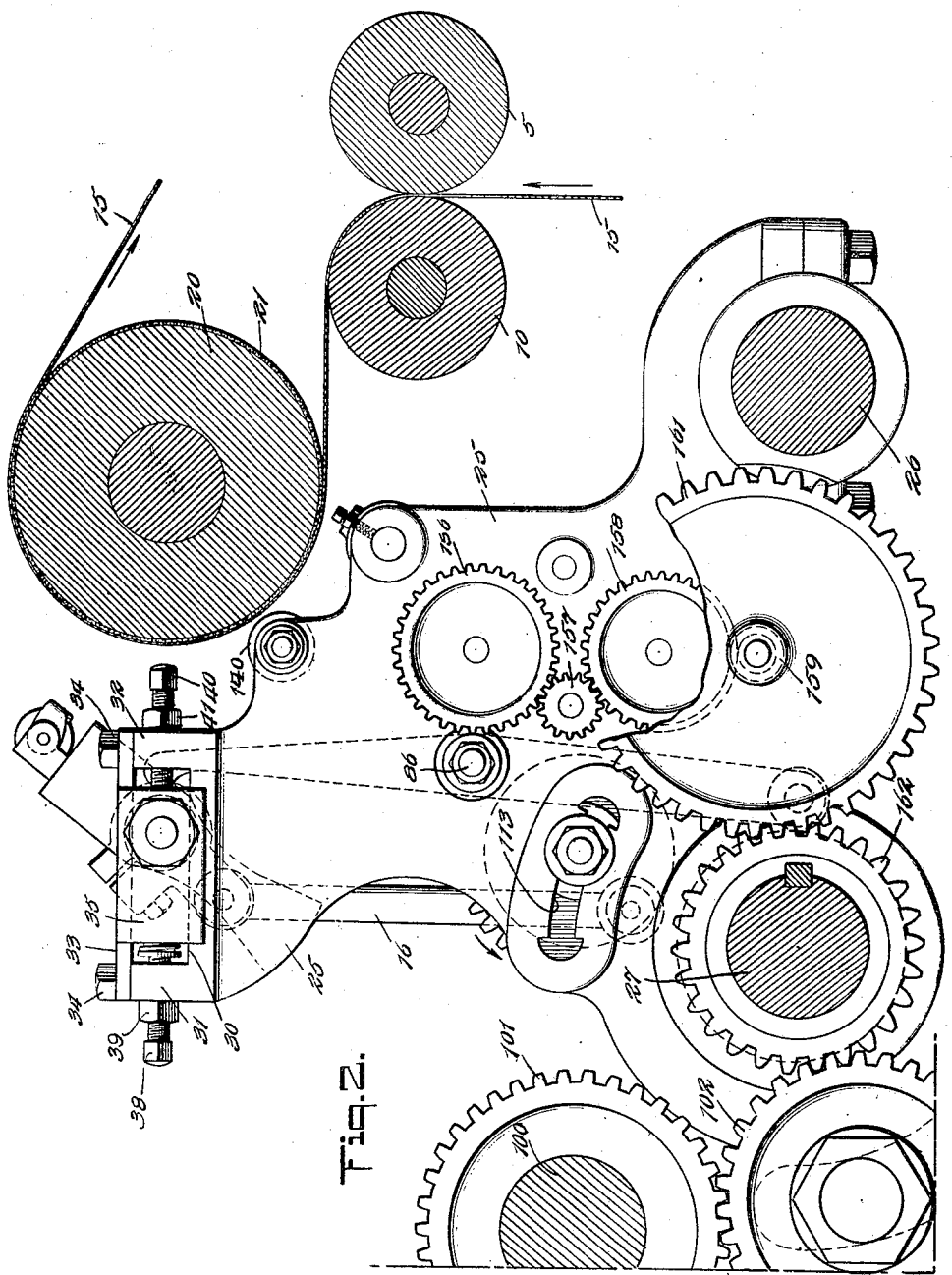
INVENTOR
George W. Swift, Jr.
by Knight Bro
ATTORNEYS

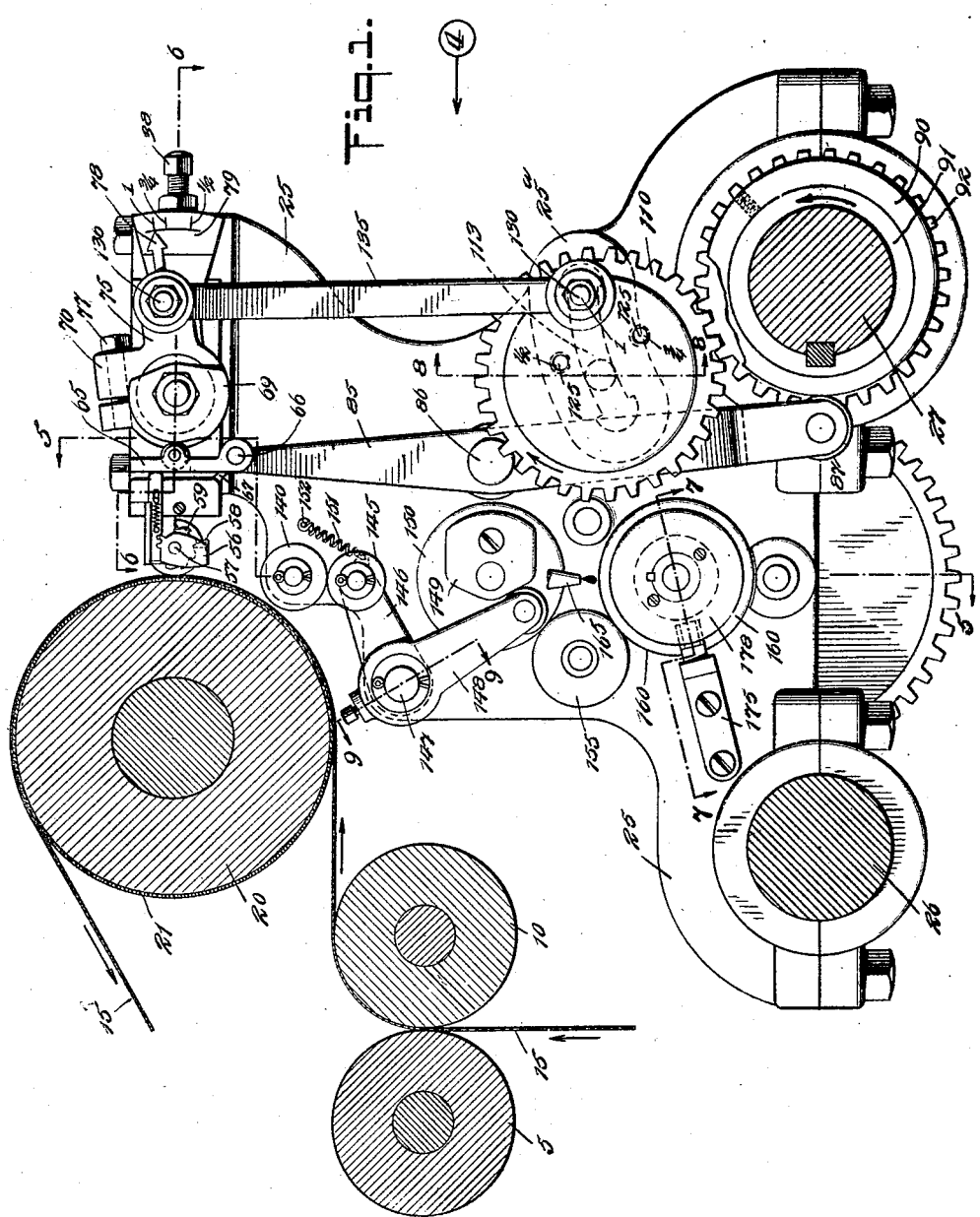

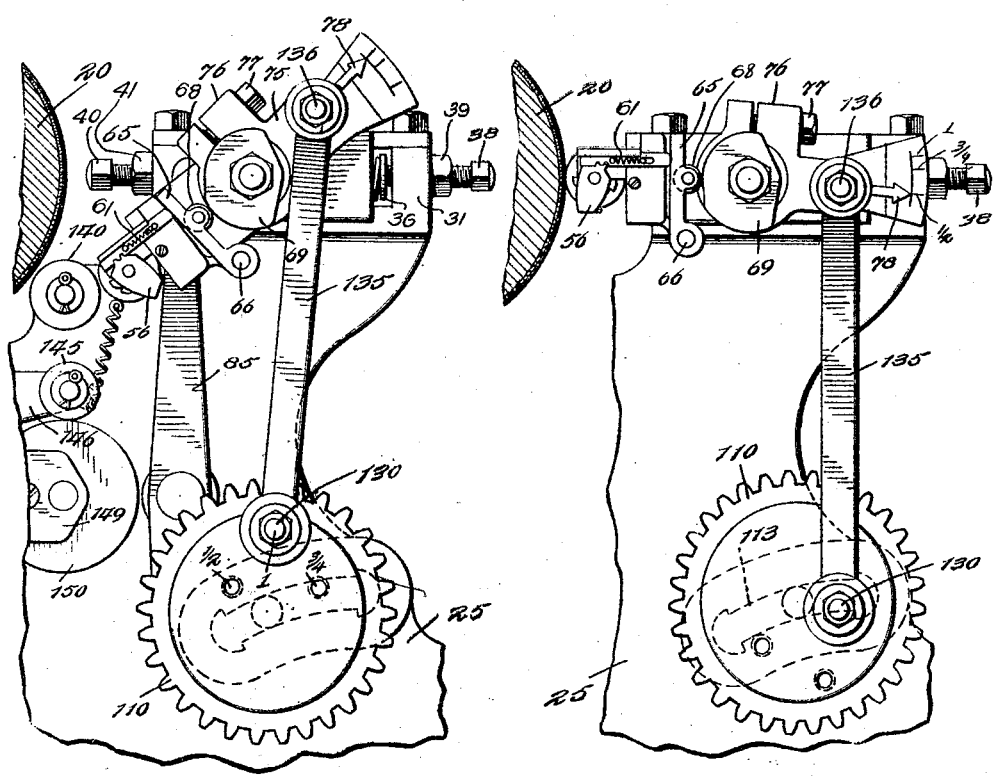
Fig.3.   Fig.11.ᵃ
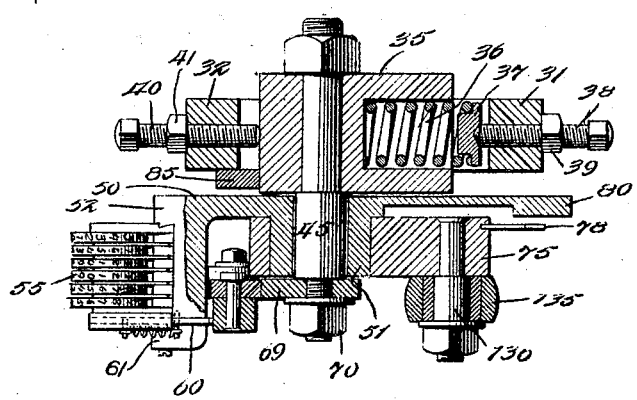
Fig.6.

July 15, 1924.
G. W. SWIFT, JR
1,501,500
MECHANISM FOR MAKING IMPRESSIONS UPON TRAVELING SHEETS OR WEBS
Filed Feb. 12, 1923   6 Sheets-Sheet 4
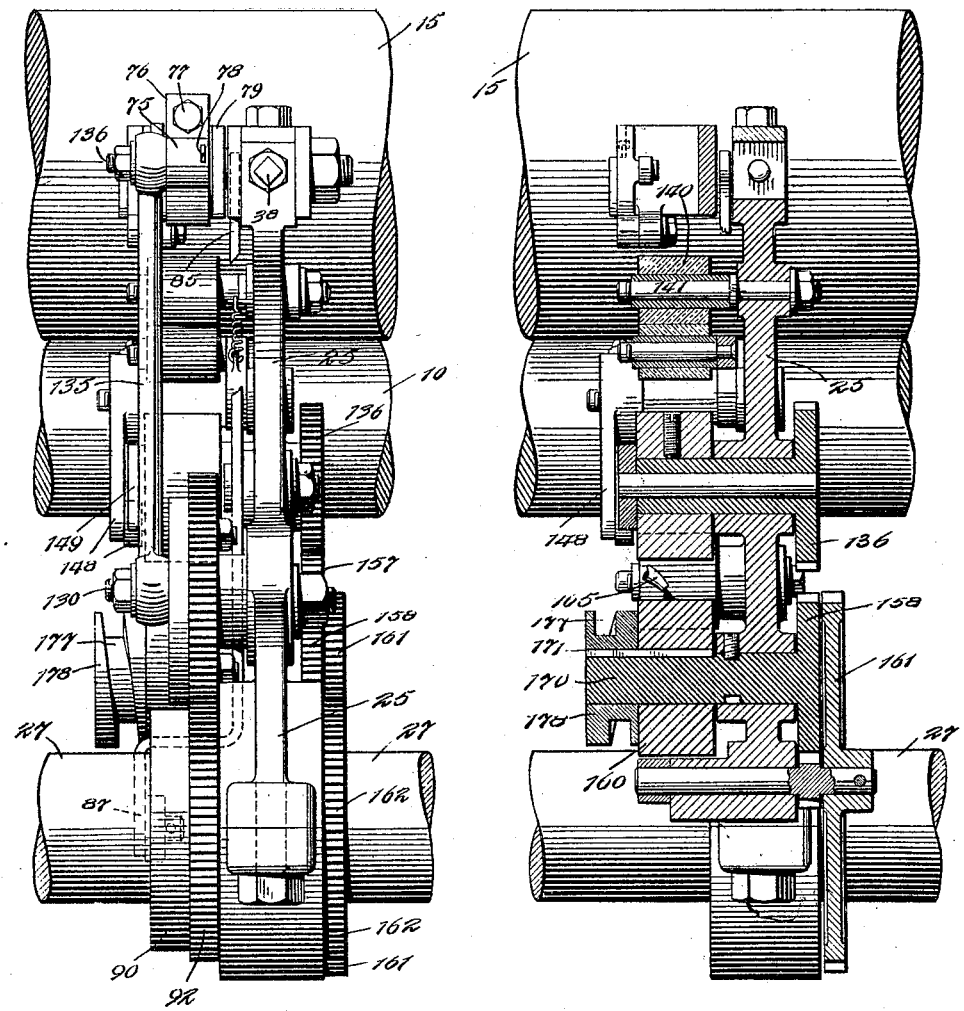
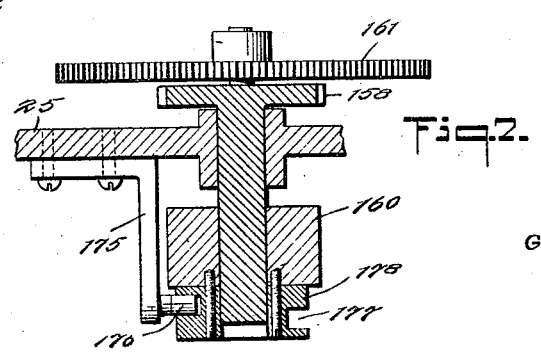
INVENTOR
George W. Swift, Jr.
BY Knight Bro
ATTORNEYS July 15, 1924.
G. W. SWIFT, JR
1,501,500
MECHANISM FOR MAKING IMPRESSIONS UPON TRAVELING SHEETS OR WEBS
Filed Feb. 12, 1923
6 Sheets-Sheet 5
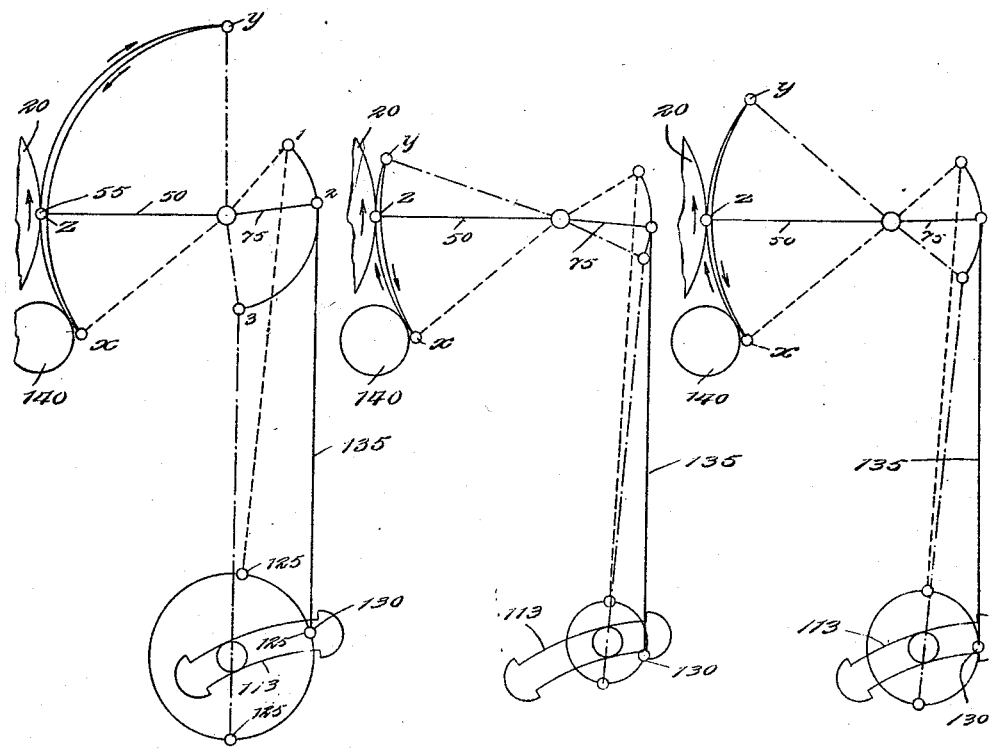
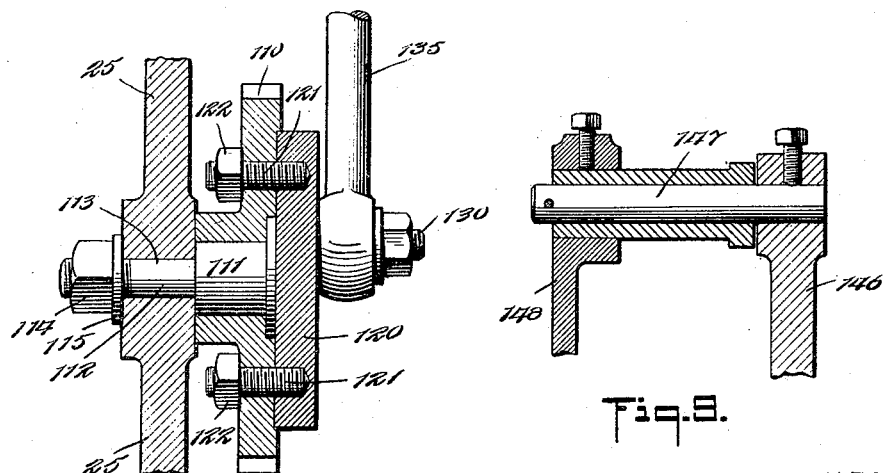
INVENTOR
George W. Swift, Jr.
BY Knight Bro.
ATTORNEYS

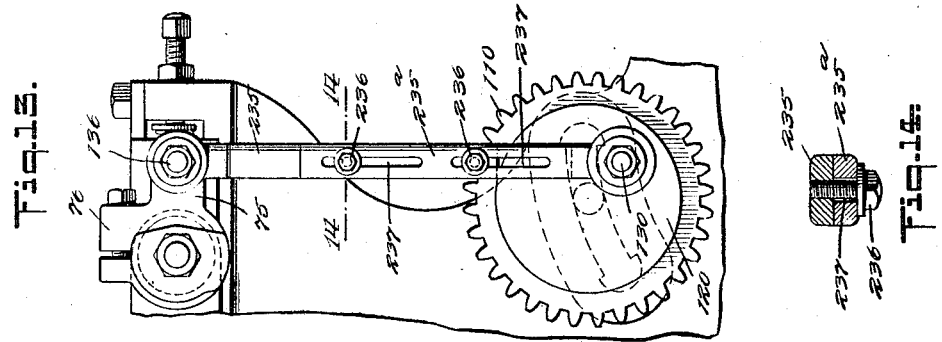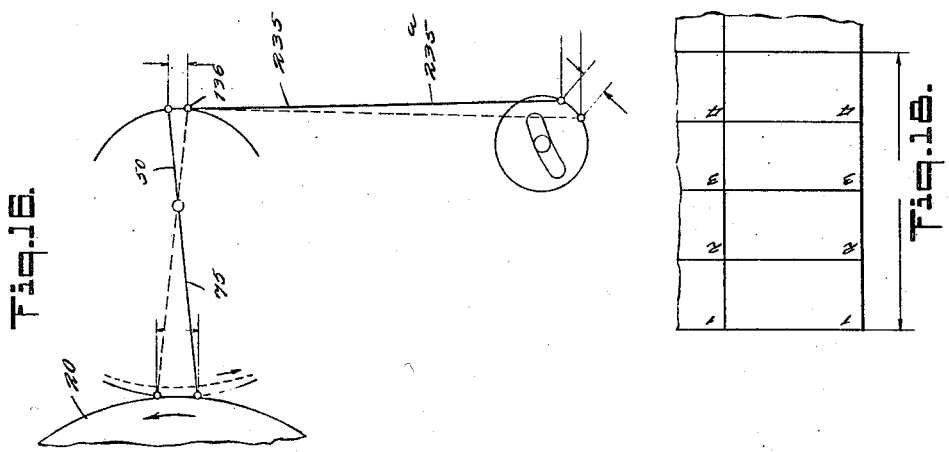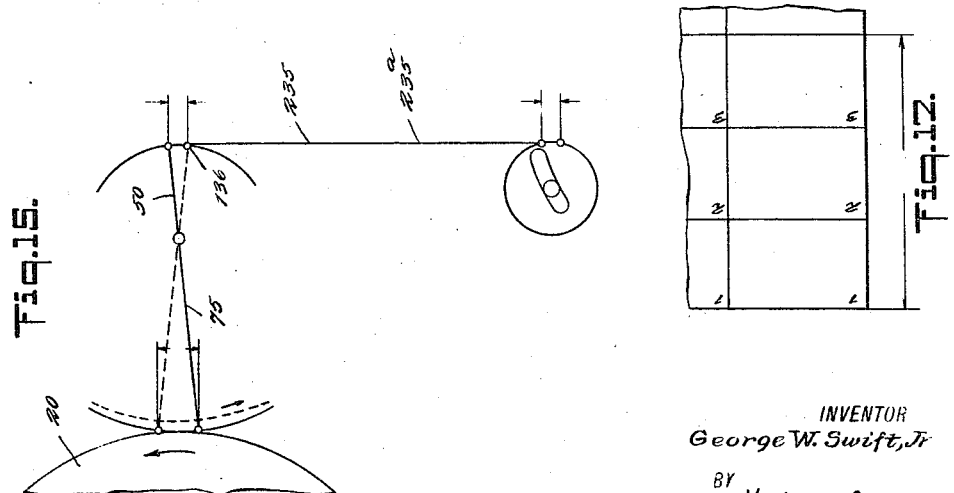

Patented July 15, 1924.

1,501,500

UNITED STATES PATENT OFFICE.

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY.

MECHANISM FOR MAKING IMPRESSIONS UPON TRAVELING SHEETS OR WEBS.

Application filed February 12, 1923. Serial No. 618,571.

*To all whom it may concern:*

Be it known that I, GEORGE W. SWIFT, Jr., a citizen of the United States, and resident of Bordentown, county of Burlington, State of New Jersey, have invented certain new and useful Improvements in Mechanism for Making Impressions upon Traveling Sheets or Webs, of which the following is a specification.

The present invention relates to an improved mechanism for making impressions upon traveling sheets or webs, said mechanism being applicable for printing successive numbers or other additional matter upon bills or forms, or for punching holes or otherwise making impressions or marks at the desired intervals upon a traveling sheet or web material.

In machines heretofore employed for numbering successive bills or forms, each printing or number device has been capable of acting only once for each revolution of the impression cylinder with which it cooperates, so that it has been necessary, in successively numbering forms of less length than the circumference of the impression cylinder, to provide a number of printing heads for each longitudinal series of forms equal to the number of form lengths making up the impression cylinder circumference. For instance, in the numbering of form lengths of one-fourth the impression cylinder circumference, it has, in the past, been necessary to employ four successively acting numbering heads, each head having the number-changing mechanism arranged to increase in units of four for each change. In printing forms upon a wide web of paper there are sometimes as many as eight or ten longitudinal series of forms, which, with a form length of one-fourth the impression cylinder circumference, necessitate the employment of thirty-two or forty numbering heads for accomplishing the desired numbering of the forms. The numbering heads arranged at intervals transversely of a large machine usually have their printing wheels coupled up to a common thin shaft which simultaneously shifts the wheels for successive numbers in all the transverse series of heads. Frequent twisting of this long thin shaft results in the inaccurate operation of the mechanism. This old form of mechanism is not only objectionable for reasons pointed out, but is of great expense in its original cost, because of the large number of numbering heads that have to be made and accurately positioned in the machine, and a great deal of time and care are required for adjusting the mechanism every time a new job is to run through the machine.

The improved mechanism for numbering, printing or punching sheets or webs forming the subject of the present application is designed to greatly reduce the original cost of such mechanisms and simplify the manipulation and adjustment of the printing or punching devices in setting up the machine for a particular new piece of work. To this end, the present invention comprises an adjustable unitary printing or punching mechanism in the form of an oscillating element mounted upon a reciprocating carriage so geared to the driving mechanism of the machine that the carriage will be moved toward the impression cylinder at intervals corresponding to the timed succession of bills or forms to be numbered, punched or otherwise marked, and the movement of the printing or punching element in engagement with the traveling sheets or web carried by the impression cylinder will be effected at the surface speed of the sheets or web. The correct intermittent movement of the carriage is determined by proportional gearing between the driving mechanism from which the impression cylinder is operated and the carriage operating mechanism, this gearing being in the proportion of one to one for operating upon forms equal in length to the circumference of the impression cylinder, two to one in cases where the forms are of a length equal to half of said circumference, three to one in case of a third of said circumference and four to one in case of a quarter, and so on. In this way, the periodicity of operation is caused to accurately agree with the length of forms traveling through the machine, so that a single printing or punching head can take care of all of the forms of a longitudinal series, and the number of such heads employed will depend upon the number of forms side by side in the web. Any change in the surface speed of the impression cylinder causes the same proportional increase or decrease in rapidity of operation of the printing or punching mechanism because of the geared relationship referred to.

An additional important element of the improved mechanism resides in the means for effecting the operation of the oscillating, printing or punching mechanism in printing or punching position against the impression cylinder at the surface speed of the sheets or web operated upon. This oscillation is induced by adjustable driving mechanism actuated from the proportional gear drive of the reciprocating carriage and so arranged that no matter whether the carriage is reciprocated rapidly for action upon short forms or slowly for action upon relatively long forms, the adjustable gearing can be adjusted to cause the printing or punching head to travel at the surface speed of the sheets or web when operating.

More specifically the improved printing or punching mechanism embodies an oscillating lever carrying a numbering head, punch or other marking device, connected through an adjustable arm and pitman with an adjustable crank carried by a driven gear whose axis of rotation is adjustable circumferentially of a driving gear forming part of the proportional operating mechanism of the reciprocating carriage. By these adjustments it is possible to arrange the mechanism so that the maximum speed of the crank of the driven gear will cause the printing head or punch to travel at a speed equal to the surface speed of the web operated upon and the printing or punching operation will take place during this maximum crank speed. The crank operation of the printing or punching head is such that the maximum speed is active while the reciprocating carriage is held adjacent to the impression cylinder and the return movement at a variable speed while the carriage is moved away from the impression cylinder; the numbering wheels being shifted and inked between the completion of one impression and the start of a succeeding impression. It will, of course, be understood that, in the case of a punching operation, there is no movement of parts similar to the shifting of the numbering wheels.

In order that the invention may be fully understood it will first be described with reference to the accompanying drawings, and afterwards pointed out more particularly in the annexed claims.

In said drawings;

Fig. 1 is a side elevation of the improved mechanism in the form of a numbering device, the numbering head being shown in printing position;

Fig. 2 is a similar view taken from the opposite side of the mechanism and showing the printing head approaching the end of its upward or printing stroke;

Fig. 3 is a view, similar to Fig. 1 with parts omitted, showing the printing head at the end of its return stroke;

Fig. 4 is a rear elevation of the mechanism looking in the direction of arrow 4 in Fig. 1;

Fig. 5 is a vertical transverse sectional view taken on the line 5—5 of Fig. 1;

Fig. 6 is a horizontal sectional view taken on the line 6—6 of Fig. 1;

Fig. 7 is a detail horizontal sectional view taken on the line 7—7 of Fig. 1;

Figs. 8 and 9 are detail sectional views taken respectively on the lines 8—8 and 9—9 of Fig. 1;

Figs. 10, 11 and 12 are detail diagrammatic views illustrating the movements of parts of the improved numbering mechanism in three adjusted relationships;

Fig. 11ª is a detail view similar to Fig. 1, with parts omitted, showing the printing head operating mechanism adjusted for operating upon a different length of blank. The parts are shown in Fig. 11ª adjusted to correspond to the diagrammatic illustration of Fig. 11;

Fig. 13 is a detail side elevation of a modified form of mechanism for operating the printing head;

Fig. 14 is a transverse sectional view of the adjustable connecting rod taken on the line 14—14 of Fig. 13;

Figs. 15 and 16 are diagrammatic illustrations of the movements of parts of the modified form of mechanism in two adjusted relationships;

Figs. 17 and 18 are detail diagrammatic illustrations of webs of different printed form-lengths for which the adjusted positions of the modified mechanism illustrated in Figs. 15 and 16 are suitable for numbering.

In illustrating the improved numbering or punching mechanism the invention is shown in the drawings in its embodiment as a numbering or printing device for printing successive numbers upon a series of printed forms either in successively feeding sheets or as is more usual, in the form of a continuous web of paper. The improved numbering mechanism is usually applied to a large machine adapted to print forms upon a continuous web or paper and in the drawings just enough of such a large machine is shown to clearly illustrate the principle of the improved mechanism.

In Figs. 1 and 2 of the drawings 5, 10 represent feeding and guiding rollers between which pass a continuous web of paper indicated at 15. The web 15 passes around an impression cylinder 20 which is preferably provided with a rubber blanket, or other yielding surface indicated at 21.

Mounted in operative relation to the traveling impression surface of the cylinder 20 is one or more of improved numbering mechanisms constructed in accordance with the present invention. It will be understood that one of these improved numbering mechanisms is designed for operating upon each longitudinal series of printed forms and that there will be as many of said mechanisms arranged transversely of the machine as there are zones or series of forms to be numbered. One of the distinctive features of the present invention over the prior art is that the single numbering mechanism of the improved construction is capable of properly numbering all of the successive forms in a longitudinal series or zone of the work.

25 is a frame or bracket suitably mounted upon a stationary frame bar 26 and a transverse shaft 27, the frame being suitably journalled upon the shaft 27. The upper end of the frame 25 is formed with a guide track 30 between the two limiting lugs 31, 32 to receive a flanged sliding block or carriage 35. The block or carriage 35 is confined upon the track by a plate 33 secured to lugs 31, 32 by means of set screws 34.

The block or carriage 35 is formed with a recess in one end to receive a spring 36 engaged by a follower 37 held in desired position by bolt 38 threaded through lug 31 and secured in the desired adjusted position by lock-nut 39. This spring 36 tends to move the block or carriage 35 toward the impression cylinder 20. A bolt 40 threaded through the lug 32 determines the extent of movement of block or carriage 35 toward the cylinder 20. Bolt 40 carries a locknut 41.

The block or carriage 35 has a journal pin 45 securely mounted upon it and projecting laterally to receive the oscillating lever member 50 which is formed with a central hub portion 51 journalled upon bolt 45 with a flanged head 50 in which is mounted a numbering head of a series of numbering wheels indicated at 55. This numbering head is of well-known construction, it being provided with a series of numbering wheels adapted to be successively shifted for printing successive numbers upon bills or forms. The specific arrangement of parts will not be described in detail except to refer to the oscillating arm 56 journalled upon the numbering head axis 57 carrying a dog 58 which engages a ratchet wheel 59 operating the wheel shifting device. This dog carrying arm 56 is engaged at the top by a short rack bar 60, which is held in retracted position by a spring 61 connecting the rack bar with a pin extending from head 52 and adapted to be periodically moved against the action of said spring for advancing the numbering wheels. This operation of the number controlling rack bar 60 is through the medium of a lever 65 pivoted at 66 to a bracket 67 projecting from head 52. Lever 65 carries between its ends an anti-friction roller 68 which runs in peripheral engagement with a relatively stationary cam 69 secured to a reduced end of the journal pin 45 by means of bolt 70. The action of cam 69 upon lever 65 is brought about by oscillation of member 50 in the manner hereinafter explained.

Adjustably clamped to the hub portion 51 of member 50 is an operating arm 75 formed with a split ring or collar 76 engaged by set screw 77 by which it is clamped upon the hub member 51 referred to. By this means the position of operating arm 75 upon member 50 can be adjusted about the axis 45. This operating arm 75 preferably carries an indicator finger 78 presented adjacent to a scale 79 upon the plate extension 80 of member 50. The indicator and scale are for the purpose of assisting in the adjustment of operating arm 75 upon the oscillating member 50 as will be explained more fully hereinafter.

85 is a controlling lever pivoted to the frame 25 at 86 and having its upper end engaging the reciprocating block or carriage 35 adjacent to lug 32. The lever 85 moves block or carriage 35 in its guideway in opposition to the action of spring 36. The lower end of the lever 85 carries its antifrictional roller 87 which runs in peripheral engagement with an eccentric ring 90 adjustably mounted upon the laterally extended hub 91 of a driving gear 92 which is keyed to the shaft 27 above referred to. By this arrangement it will be understood that the lever 85 is rocked back and forth once for each revolution of the shaft 27 which is driven by gearing from the main driving shaft of the machine.

100 indicates the main driving shaft, 101 a driving gear, 102 an intermediate gear and 103 a gear upon shaft 27. The gear 101 is removably mounted for the purpose of changing the gear relation between the driving shaft 100 and shaft 27, there being a fixed ratio between the main driving shaft 100 and the impression cylinder 20. If the form lengths passing over impression cylinder 20 take up the entire circumference of that cylinder it will be clear that the printing mechanism must operate once for each revolution of the impression cylinder and that, therefore, the gear arrangement between the main driving shaft 100 and controlling shaft 27 shall be such as to get this relationship. If the job is upon form lengths of one-half the impression cylinder circumference, then the gear relationship must be such as to cause the printing mechanism to operate twice for each revolution of the impression cylinder, and three times where the form lengths are one-third of said impression circumference, and four times when the form lengths are one-fourth the said impression circumference. This gear relationship is obtained by the mounting of the proper sized gear upon the main driving shaft 100.

Gear 92 upon shaft 27 meshes with and drives a gear 110 journalled upon a stud 111, having a reduced end or integral bolt 112 which passes through a curved slot 113 of frame 25, and is secured in the desired adjusted position in said slot by means of a nut 114 which is screwed upon the threaded end of bolt 112 and clamps the washer 115 against the surface of frame 25. The frame 25 is formed with a thickened reinforced portion 25$^a$ through which the slot 113 is cut. The slot 113 is formed on an arc concentric with the axis of shaft 27 so that by loosening nut 114 the bearing stud 111 can be adjusted within the limits of slot 113 circumferentially of the gear 92. The purpose of this adjustment will presently appear.

Secured to the face of the driven gear 110 is a crank disk 120 engaged by screw bolts 121 which pass through the web of gear 110 and are threaded into sockets formed in the inner face of disk 120. Nuts 122 threaded upon bolts 121 secure bolts 121 in position.

The crank disk 120 is provided with a plurality of threaded sockets 125 at varying radial distances from the axis of rotation of gear 110. A crank pin 130 is removably mounted in one of the sockets 125 of crank disk 120 so that it can be placed in any one of the several sockets shown depending upon the length of throw of crank that it is desired to have in producing the particular speed of the printing head on its operative stroke. A pitman 135 is journalled upon the crank pin 130 and projects upwardly therefrom and is journalled upon the pin 136 projecting laterally from the adjustable arm 75 of the oscillating member 50 above referred to. The rotation of the crank 130 causes the oscillating member 50, carrying the printing head, to be rocked upon its bearing while performing the printing operation in a manner which will be hereinafter more particularly described. 140 is an inking roller journalled upon a spindle 141 projecting from the frame 25 in position to have rolling contact with the wheels of the printing head when they move upwardly from the position shown in Fig. 3 preparatory to a printing operation. This inking roller 140 has ink supplied to its surface periodically by a roller 145 carried by a rock arm 146 projecting from a rock shaft 147 journalled in the machine frame 25 and carrying a rock arm 148 which operates in engagement with a cam 149 secured to the face of an inking roller 150. A spring 151 connects rock arm 146 with the stationary pin 152 to cause the arm 148 to follow the surface of cam 149 with the result that the inking roller 145 is in intermittent contact with the inking roller 150, to take ink therefrom and impart it to the inking roller 140.

The inking roller 150 receives ink from an intermediate roller 155 which runs in peripheral contact with roller 150 and also with a fountain distributing roller 160. The rollers 150, 155, and 160 are rotated by a train of gears 156, 157, 158, 159, 161 and 162, the last named gear 162 being keyed to the shaft 27 and driven from the main drive shaft 100 through the adjustable proportional train of gearing above referred to. The fountain distributing ink roller 160 may receive ink from any suitable supply which is indicated in the drawings as a drip nozzle 165. Roller 160 is splined at 171 upon a shaft 170 rotated by gear 158 above referred to. A bracket arm 175, projecting from frame 25, carries an antifriction roller 176 which engages a cam groove 177, formed in a collar 178 secured to the face of the roller 160. As the roller 160 is rotated the engagement of part 176 with the cam collar 178 will cause the roller to move inwardly and outwardly upon its shaft for distributing and breaking up the ink that is transferred to the intermediate ink roller 155.

In the operation of the improved numbering mechanism, the block or carriage 35 is normally held away from impression cylinder 20 by the controlling lever 85. Once for each revolution of the shaft 27 the lever 85 will permit the spring 33 to move the block or carriage 35 toward the impression cylinder and this movement toward the impression cylinder is simultaneous with the upward or printing motion of the oscillating member 50. After the printing operation the block or carriage 35 is forced away from the impression cylinder and while in this position member 50 makes its return stroke.

Referring particularly to Figs. 10, 11 and 12 of the drawings, the operation will be best understood from a comparison of the parts of the mechanism in the three adjusted positions. In each of these views the three positions of the printing head, i. e., at the opposite ends of its stroke and in printing position in engagement with the impression cylinder, are indicated at X, Y, and Z. In moving from position X upwardly in the act of printing, the type of the printing head receive ink from the inking roller 140. The movement of the printing head from position X through printing position Z into the uppermost position Y is performed with the block or carriage 35 in its innermost position adjacent to impression cylinder 20, while the movement of the printing head on its return from position Y to position X is performed while the carriage 35 is in its drawn-back position away from the impression cylinder. The adjusted positions shown in Figs. 10, 11 and 12 correspond with the three positions indicated by the scale 79 upon member 50 which indicates the adjusted positions for printing upon form lengths equal to the impression cylinder circumference, for those of three-fourths of the circumference and of one-half that circumference.

In determining the scale markings for showing the ready adjustment of parts of the improved mechanism, it is preferable to assume the starting position X to be practically the same for all the several adjustments so that the printing head will always cooperate properly with the inking mechanism. In this way the different lengths of throw for the different adjustments will result in the movement to a more or less extent above the printing point. In making the desired adjustment, the rock arm 75 is loosened upon hub member 51 and the journal pin 111 loosened in slot 113. The crank pin 130 is then moved to the crank opening of the disk 120 to give the approximate critical speed desired. The parts are then shifted to place the connecting rod 135 and crank pin 130 in line with the axis of crank disk 120. The rock arm 75 is then clamped upon the hub portion of oscillating member 50 and the parts shifted to printing position with the printing head at point Z, the gear 110 carrying crank 120 being rotated, and the journal 111 being sufficiently shifted to place the connecting rod 135 approximately parallel with the tangent to the crank disk and at right angles to the oscillating member 50 in its printing position.

In Figs. 13 and 14 a slight modification is shown in which the parts are of the same construction as hereinbefore described with the exception of the connecting rod between the driving crank and the adjustable rock arm of the oscillating member. The parts which are the same as in the preferred form are given the same numerals in this modified form. The connecting rod is made in two sections 235, 235ª journalled respectively upon the pin 136 of arm 75 and the crank pin 130 of crank disk 120. These two connecting rod sections are adjustably secured together by means of set screws 236 passing through elongated slots 237 of member 235ª and threaded in suitable openings of member 235. By loosening bolts 236 the connecting rod 235, 235ª can be lengthened or shortened. This modified mechanism enables the adjustment of the mechanism for operating the oscillating member at the desired speed without the necessity for changing the length of the crank. By adjusting the crank arm 75 upon member 50 and determining the approximate positions of the printing head and crank during the printing movement the speed of operation of the printing head for the particular work can be determined. In this adjustment the connecting rod will be approximately perpendicular to the oscillating member 50 when the parts are in printing position. The diagrammatic forms shown below Figs. 15 and 16 represent the form lengths which can be printed from the adjustments shown respectively in Figs. 15 and 16, with the understanding, however, that the reciprocation of the carriage 35 is effected at the proper intervals of time by the proportional driving gearing referred to.

I claim:—

1. The combination with a traveling impression surface adapted to conduct a sheet or web, of a carriage movable toward and away from said impression surface, an oscillating member journalled upon said carriage, and operating mechanism for periodically moving said carriage and oscillating member to cause the latter to contact with and travel in the same direction and at the same speed as the impression surface.

2. The combination with a traveling impression surface adapted to conduct a sheet or web, of a carriage movable toward and away from said impression surface, adjustable operating mechanism for periodically moving said carriage, an oscillating member journalled upon said carriage, and means actuated by said operating mechanism for causing said oscillating member to travel in contact with and at the same speed as the impression surface.

3. The combination with a traveling impression surface adapted to conduct a sheet or web, of a carriage movable toward and away from said impression surface, adjustable operating mechanism for timing the movement of said carriage in proportional relation to the speed of said impression surface, an oscillating member journalled upon said carriage, and means driven by said operating mechanism for causing said oscillating member to travel in the same direction and at the same speed as the impression surface.

4. The combination with a traveling impression surface adapted to conduct a sheet or web, and a main driving shaft from which said impression surface is operated, of a carriage movable toward and away from said impression surface, proportional gearing between said main driving shaft and said carriage for periodically moving said carriage in the desired timed relation to said impression surface, an oscillating member journalled upon said carriage, and means operated by said proportional gearing for causing said oscillating member to contact with and travel in the same direction and at the same speed as the impression surface.

5. In a device of the character set forth, the combination of a traveling impression surface adapted to carry web or sheet forms, with an oscillating member mounted in operative relation to said impression surface, a driving gear, a driven gear adjustable circumferentially of said driving gear, operating means between said driven gear and said oscillating member, and means for adjusting the operative relation between said driven gear and oscillating member to determine the critical speed of the latter.

6. In a device of the character set forth, the combination of a main driving shaft, and a traveling impression surface adapted to carry web or sheet forms, with an oscillating member mounted in operative relation to said impression surface, a driving gear operated by said main driving shaft in timed relation to said impression surface, a driven gear adjustable circumferentially of said driving gear, operating means between said driven gear and said oscillating member, and means for adjusting the operative relation between said driven gear and oscillating member to determine the critical speed of the latter.

7. In a device of the character set forth, the combination of a main driving shaft, and a traveling impression surface adapted to carry web or sheet forms, with an oscillating member mounted in operative relation to said impression surface, a driving gear, removable and changeable proportional gearing between said main driving shaft and said driving gear, a driven gear operated by and adjustable circumferentially of said driving gear, a pitman connection between said driven gear and said oscillating member, and means for adjusting the operative relation between said driven gear and oscillating member to determine the critical speed of the latter.

8. In a device of the character set forth, the combination of a traveling impression surface adapted to carry web or sheet forms, with an oscillating member mounted in operative relation to said impression surface, a driving gear, a driven gear adjustable circumferentially of said driving gear, a crank operated by said driven gear, and adjustable operative connections between said crank and said oscillating member for determining the critical speed of the latter.

9. In a device of the character set forth, the combination of a traveling impression surface adapted to carry web or sheet forms, with an oscillating member mounted in operative relation to said impression surface, a driving gear, a driven gear adjustable circumferentially of said driving gear, a crank carried by said driven gear, adjustable operative connections between said crank and said oscillating member for determining the critical speed of the latter, and changeable proportional gearing for operating said driving gear.

10. In a device of the character set forth, the combination of a main driving shaft, and a traveling impression surface adapted to carry web or sheet forms, with an oscillating member mounted in operative relation to said impression surface, a driving gear, changeable gearing between said main driving shaft and said driving gear, a driven gear operated by and adjustable circumferentially of said driving gear, a crank mounted upon said driven gear, an adjustable arm upon said oscillating member, and a pitman connecting said crank and said arm.

11. In a device of the character set forth, the combination of a traveling impression surface adapted to carry web or sheet forms, with an oscillating member mounted in operative relation to said impression surface, a driving gear, a driven gear adjustable circumferentially of said driving gear, a crank operated by said driven gear and adjustable to vary its throw, and a pitman connecting said crank with said oscillating member.

12. In a device of the character set forth, the combination of a traveling impression surface adapted to carry web or sheet forms, with an oscillating member mounted in operative relation to said impression surface, a driving gear, a driven gear adjustable circumferentially of said driving gear, a crank removably mounted upon said driven gear and adjustable to different radial distances from the axis of said driven gear, and a pitman connecting said crank with said oscillating member.

13. In a device of the character set forth, the combination of a traveling impression surface adapted to carry web or sheet forms, with an oscillating member mounted in operative relation to said impression surface, an operating arm adjustably mounted upon said oscillating member, a driving gear, a driven gear adjustable circumferentially of said driving gear, a crank operated by said driven gear and adjustable relative to the axis of said driven gear, and a pitman connecting said crank with the adjustable operating arm of said oscillating member.

14. In a device of the character set forth, the combination of a traveling impression surface adapted to carry web or sheet forms, with an oscillating member mounted in operative relation to said impression surface, an operating arm mounted upon said oscillating member and adjustable about the axis of movement thereof, a driving gear, a driven gear adjustable circumferentially of said driving gear, a crank operated by said driven gear and adjustable relative to the axis of said driven gear, and a pitman connecting said crank with the adjustable operating arm of said oscillating member.

15. In a device of the character set forth, the combination of a traveling impression surface, with a suitable frame formed with a guide track, a carriage operating upon said guide track, a spring moving said carriage toward said impression surface, a controlling lever engaging said carriage and moving it away from said impression surface, timed operating means for said lever, an oscillating member journalled upon said carriage, and means for operating said oscillating member.

16. In a device of the character set forth, the combination of a traveling impression surface, a suitable frame, a carriage mounted in said frame to move toward and away from said impression surface, a controlling lever engaging said carriage, an oscillating member journalled upon said carriage, and a timed operating mechanism for said controlling lever and oscillating member.

17. In a device of the character set forth, the combination of a traveling impression surface, with an oscillating member mounted in operative relation to said impression surface, a suitable frame, a driving gear, a driven gear meshing with said driving gear, a journal for said driven gear mounted in said frame and adjustable therein circumferentially of said driving gear, adjustable crank operated by said driven gear, and operating means between said crank and said oscillating member.

GEORGE W. SWIFT, Jr.